(12) United States Patent
Huang

(10) Patent No.: US 9,660,794 B2
(45) Date of Patent: May 23, 2017

(54) BI-DIRECTIONAL FULL-DUPLEX LOCK SYSTEM APPLIED IN DATA TRANSMISSION INTERFACE AND OPERATING METHOD THEREOF

(71) Applicant: Raydium Semiconductor Corporation, Hsinchu (TW)

(72) Inventor: Da-Rong Huang, Hualien (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 132 days.

(21) Appl. No.: 14/796,936

(22) Filed: Jul. 10, 2015

(65) Prior Publication Data
US 2016/0020895 A1    Jan. 21, 2016

(30) Foreign Application Priority Data
Jul. 18, 2014   (TW) .................. 103124804

(51) Int. Cl.
*H04B 7/14*       (2006.01)
*H04L 5/14*       (2006.01)
*G09G 5/20*       (2006.01)

(52) U.S. Cl.
CPC ............ *H04L 5/1461* (2013.01); *G09G 5/20* (2013.01); *G09G 2370/08* (2013.01)

(58) Field of Classification Search
CPC ....... H04L 5/1461; H04L 5/14; H04L 5/1423; H04L 5/16; G09G 5/20; G09G 2370/08; H04B 3/23; H04B 3/20; H04B 3/234
USPC ........ 370/276, 278, 279, 282, 287, 292, 293
See application file for complete search history.

(56) References Cited

U.S. PATENT DOCUMENTS

| | | | |
|---|---|---|---|
| 2010/0225637 A1* | 9/2010 | Jeon | ................ G09G 3/20 345/213 |
| 2011/0181558 A1* | 7/2011 | Jeon | ................ G09G 3/3611 345/204 |
| 2011/0242066 A1* | 10/2011 | Jeon | ................ G09G 3/20 345/204 |

\* cited by examiner

*Primary Examiner* — Brenda H Pham

(57) ABSTRACT

A bi-directional full-duplex lock system applied in a data transmission interface of a liquid crystal display is disclosed. The data transmission interface includes a transmitter and a receiver. The bi-directional full-duplex lock system includes a detection module and a control module. The detection module detects a transmitter link state of transmitter and a receiver link state of receiver respectively. The control module controls transmitter to transmit a lock signal to receiver, controls receiver to transmit the lock signal to transmitter, and controls one receiver to transmit the lock signal to another receiver. The lock signal relates to transmitter link state and receiver link state. When transmitter transmits the lock signal to receiver, a phase of the lock signal will be reversed for the receiver to detect whether its own frequency is correct.

8 Claims, 3 Drawing Sheets

BI-DIRECTIONAL FULL-DUPLEX LOCK SYSTEM APPLIED IN DATA TRANSMISSION INTERFACE AND OPERATING METHOD THEREOF

BACKGROUND OF THE INVENTION

Field of the Invention

This invention relates to a data transmission interface, especially to a bi-directional full-duplex lock system and a bi-directional full-duplex lock system operating method applied in a data transmission interface of a LCD apparatus.

Description of the Related Art

In general, in a high-speed transmission interface applied in a conventional LCD apparatus, a lock signal is necessary to inform a transmitter (TX) or a receiver (RX) whether a link is completed, and after the link is completed, the lock signal is still necessary to inform the system about the state of the link. Therefore, how to accurately detect the link state of the transmitter (TX) or the receiver (RX) will become very important.

However, there are still many problems existed in the lock signal communication mechanism used in the current high-speed transmission interface of the LCD apparatus. For example, the link states among source driver ICs cannot be effectively confirmed, so that the receiver (RX) will be locked at the harmonic frequency; when a link of one of the source driver ICs is invalid, a training of the transmitter (TX) will be started again, but the normal source driver ICs will still blind display. These problems need to be overcome.

Therefore, the invention provides a bi-directional full-duplex lock system and a bi-directional full-duplex lock system operating method to solve the above-mentioned problems.

SUMMARY OF THE INVENTION

An embodiment of the invention is a bi-directional full-duplex lock system operating method. In this embodiment, the bi-directional full-duplex lock system is applied in a data transmission interface. The data transmission interface includes at least one transmitter and at least one receiver. The bi-directional full-duplex lock system operating method includes steps of: (a) controlling the at least one transmitter and the at least one receiver originally in a unlock state; (b) when the at least one transmitter starts to transmit a data to the at least one receiver, changing the at least one transmitter from the unlock state to a lock state and starting a training of the at least one receiver; (c) finishing the training of the at least one receiver and changing the at least one receiver from the unlock state to the lock state; (d) changing the at least one transmitter to the unlock state and the at least one receiver detecting whether a frequency of the at least one receiver is correct; and (e) selectively changing the at least one transmitter to the lock state or changing the at least one receiver to the unlock state according to a detecting result of the step (d).

In an embodiment, the step (c) includes steps of: (c1) determining whether a receiver link state of the at least one receiver is invalid; and (c2) if a determining result of the step (c1) is yes, changing the at least one receiver to the unlock state. In an embodiment, the step (c) includes steps of: (c1') determining whether the at least one receiver receives wrong data; and (c2') if a determining result of the step (c1') is yes, changing the at least one receiver to the unlock state.

In an embodiment, the at least one transmitter transmits a lock signal to the at least one receiver, in the step (c) and the step (d), the at least one transmitter is changed from the lock sate to the unlock state, so the lock signal is reversed during a specific period of time, and the at least one receiver can detect whether a frequency of the at least one receiver is correct.

In an embodiment, the step (e) includes steps of: (e1)) if a determining result of the step (d) is yes, changing the at least one transmitter to the lock state; and (e2) if a determining result of the step (d) is no, changing the at least one receiver to the unlock state.

Another preferred embodiment of the invention is a bi-directional full-duplex lock system. In this embodiment, the bi-directional full-duplex lock system is applied in a data transmission interface. The data transmission interface includes at least one transmitter and at least one receiver. The bi-directional full-duplex lock system includes a detection module and a control module. The detection module detects a transmitter link state of the at least one transmitter and a receiver link state of the at least one receiver respectively. The control module is coupled to the detection module. The control module controls the at least one transmitter to transmit a lock signal to the at least one receiver, controls the at least one receiver to transmit the lock signal to the at least one transmitter, and controls a receiver of the at least one receiver to transmit the lock signal to another receiver of the at least one receiver. The lock signal relates to the transmitter link state and the receiver link state. When the at least one transmitter transmits the lock signal to the at least one receiver, a phase of the lock signal is reversed during a specific period of time for the at least one receiver to detect whether a frequency of the at least one receiver is correct.

In an embodiment, the at least one transmitter and the at least one receiver are originally in a unlock state, when the at least one transmitter starts to transmit a data to the at least one receiver, the control module changes the at least one transmitter from the unlock state to a lock state and starts a training of the at least one receiver.

In an embodiment, after the training of the at least one receiver is done, the control module changes the at least one receiver from the unlock state to the lock state, so the at least one transmitter and the at least one receiver are both in the lock state, and the lock signal of the at least one transmitter and the at least one receiver have a first phase at this time.

In an embodiment, when the specific period of time is started, the control module changes the at least one transmitter to the unlock state, the lock signal transmitted by the at least one transmitter to the at least one receiver has a second phase opposite to the first phase, so the at least one receiver can detect whether the frequency of the at least one receiver is correct.

In an embodiment, when the at least one receiver detects that the frequency of the at least one receiver is correct, the control module changes the at least one transmitter to the lock state; when the at least one receiver detects that the frequency of the at least one receiver is not correct, the control module changes the at least one receiver to the unlock state.

Compared to the prior arts, the bi-directional full-duplex lock system and the bi-directional full-duplex lock system operating method of the invention are applied in a data transmission interface of a LCD apparatus and they can effectively improve the lock signal communication mechanism used in the current high-speed transmission interface of the LCD apparatus. Therefore, the link states among source driver ICs can be effectively confirmed, so that when a link of one of the source driver ICs is invalid, the normal source driver ICs will not blind display.

The advantage and spirit of the invention may be understood by the following detailed descriptions together with the appended drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A preferred embodiment of the invention is a bi-directional full-duplex lock system operating method. In this embodiment, the bi-directional full-duplex lock system operating method is used to operating a bi-directional full-duplex lock system.

Figure 1:
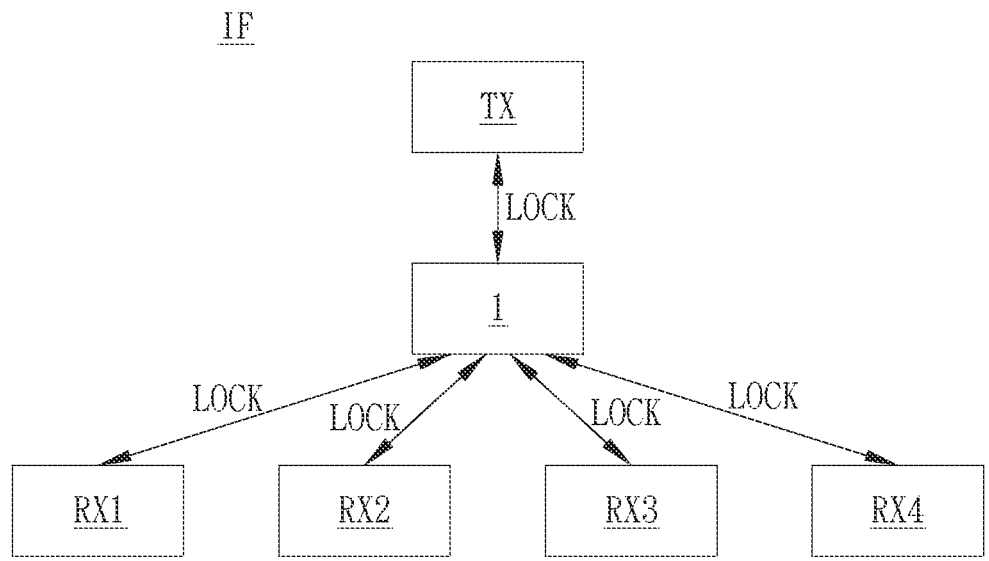
FIG. 1 illustrates a schematic diagram of the bi-directional full-duplex lock system applied in a data transmission interface of a LCD apparatus in the invention.

In general, the data transmission interface includes at least one transmitter and at least one receiver. As shown in FIG. 1, a bi-directional full-duplex lock system 1 applied in a data transmission interface IF including a transmitter TX and receivers RX1~RX4 is taken as an example, but not limited to this. In the data transmission interface IF of a LCD apparatus, the receivers RX1~RX4 can be source driver ICs, but not limited to this.

Figure 2:
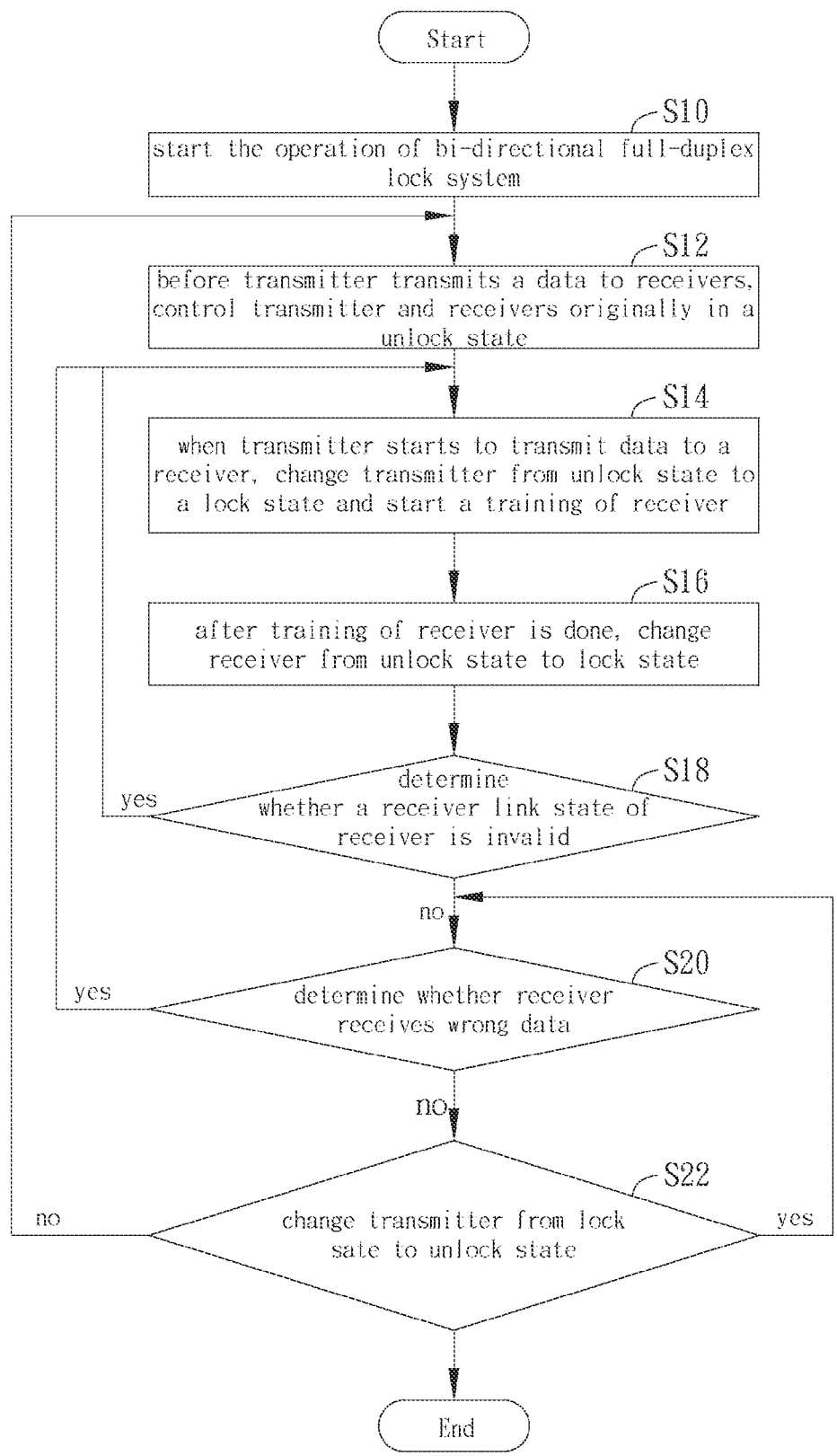
FIG. 2 illustrates a flowchart of the bi-directional full-duplex lock system operating method in the invention.

Please also refer to FIG. 2. FIG. 2 illustrates a flowchart of the bi-directional full-duplex lock system operating method in this embodiment.

As shown in FIG. 2, in the step S10, the method starts the operation of the bi-directional full-duplex lock system 1. In the step S12, before the transmitter TX of the data transmission interface IF transmits a data to the receivers RX1~RX4, the method controls the transmitter TX and the receivers RX1~RX4 originally in a unlock state.

In the step S14, when the transmitter TX starts to transmit the data to a receiver (e.g., RX1), the method will change the transmitter TX from the unlock state to a lock state and start a training of the receiver RX1. It should be noticed that the receiver RX1 is still maintained in the unlock state at this time. That is to say, the transmitter TX is in the lock state and the receiver RX1 is in the unlock state at this time.

In the step S16, after the training of the receiver RX1 is done, the method will change the receiver RX1 from the unlock state to the lock state, and the transmitter TX is still maintained in the lock state. That is to say, the transmitter TX and the receiver RX1 are both in the lock state at this time.

In the step S18, the method will determine whether a receiver link state of the receiver RX1 is invalid. At this time, the transmitter TX and the receiver RX1 are both in the lock state. If a determining result of the step S18 is yes, it means that the receiver link state of the receiver RX1 is invalid, the method will change the receiver RX1 from the lock state to the unlock state, namely the receiver RX1 is changed back to the state of the step S14. If the determining result of the step S18 is no, it means that the receiver link state of the receiver RX1 is active, the method will perform the step S20.

In the step S20, the method will determine whether the receiver RX1 receives wrong data. At this time, the transmitter TX and the receiver RX1 are both in the lock state. If a determining result of the step S20 is yes, it means that the receiver RX1 receives wrong data, the method will change the receiver RX1 from the lock state to the unlock state, namely the receiver RX1 is changed back to the state of the step S14. If the determining result of the step S20 is no, it means that the receiver RX1 does not receive wrong data, the method will perform the step S22.

In the step S22, the method will change the transmitter TX from the lock sate to the unlock state. At this time, the transmitter TX is in the unlock state and the receiver RX1 is the lock state, so the receiver RX1 can detect whether a frequency of the receiver RX1 is correct.

Figure 3:
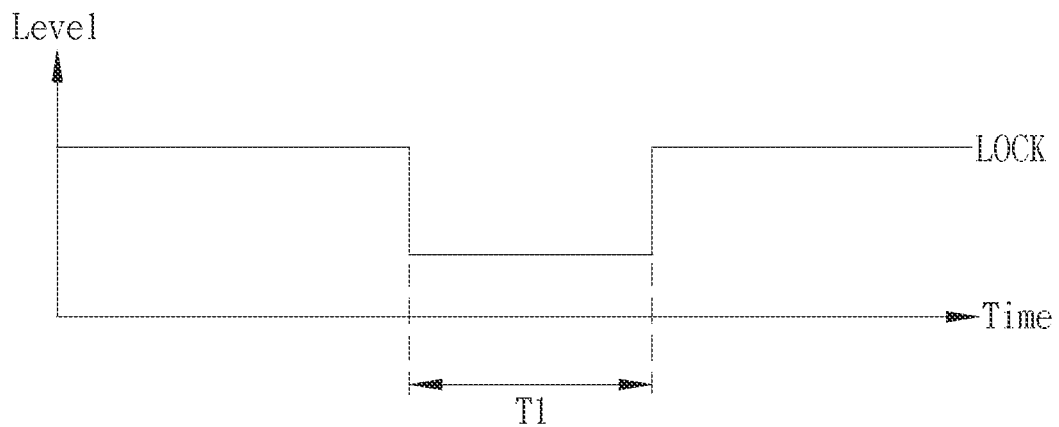
FIG. 3 illustrates a schematic diagram of the lock signal reversed during a specific period of time when the transmitter transmits the lock signal to the receiver.

As shown in FIG. 3, it should be noticed that when the transmitter TX starts to transmit data to the receiver RX1 and changed from the unlock state to the lock state in the step S14, the transmitter TX will transmit a lock signal LOCK having a first phase (high-level) to the receiver RX1. When the transmitter TX is changed from the lock state to the unlock state in the step S22, the lock signal LOCK transmitted from the transmitter TX to the receiver RX1 will be changed from the first phase (high-level) to a second phase (low-level), and the second phase is opposite to the first phase. The lock signal LOCK will be maintained in the second phase (low-level) for a specific period of time T1, so that the receiver RX1 can detect whether a frequency of the receiver RX1 is correct during the specific period of time T1. In this embodiment, the length of the specific period of time T1 is larger than 5000 packets, but not limited to this.

If a determining result of the step S22 is yes, it means that the frequency of the receiver RX1 is correct, the method will change the transmitter TX from the unlock state to the lock state. At this time, the transmitter TX and the receiver RX1 are both in the lock state, namely the transmitter TX and the receiver RX1 are changed back to the state of the step S20.

If the determining result of the step S22 is no, it means that the frequency of the receiver RX1 is incorrect, the method will change the receiver RX1 from the lock state to the unlock state. At this time, the transmitter TX and the receiver RX1 are both in the unlock state, namely the transmitter TX and the receiver RX1 are changed back to the state of the step S12.

It should be noticed that the transmitter TX can transmit the lock signal LOCK not only to the receiver RX1, but also to other receivers RX2~RX4; the receivers RX1~RX4 can transmit the lock signal LOCK to the transmitter TX respectively, or one receiver (e.g., RX1) transmits the lock signal LOCK to another receiver (e.g., RX4), but not limited to this.

Another preferred embodiment of the invention is a bi-directional full-duplex lock system. In this embodiment, the bi-directional full-duplex lock system is applied in a data transmission interface of a LCD apparatus, for example, an iSP high-speed data transmission interface of embedded clock, but not limited to this.

In general, the data transmission interface includes at least one transmitter and at least one receiver. As shown in FIG. 1, a bi-directional full-duplex lock system 1 applied in a data transmission interface IF including a transmitter TX and receivers RX1~RX4 is taken as an example, but not limited to this. In the data transmission interface IF of a LCD apparatus, the receivers RX1~RX4 can be source driver ICs, but not limited to this.

Figure 4:
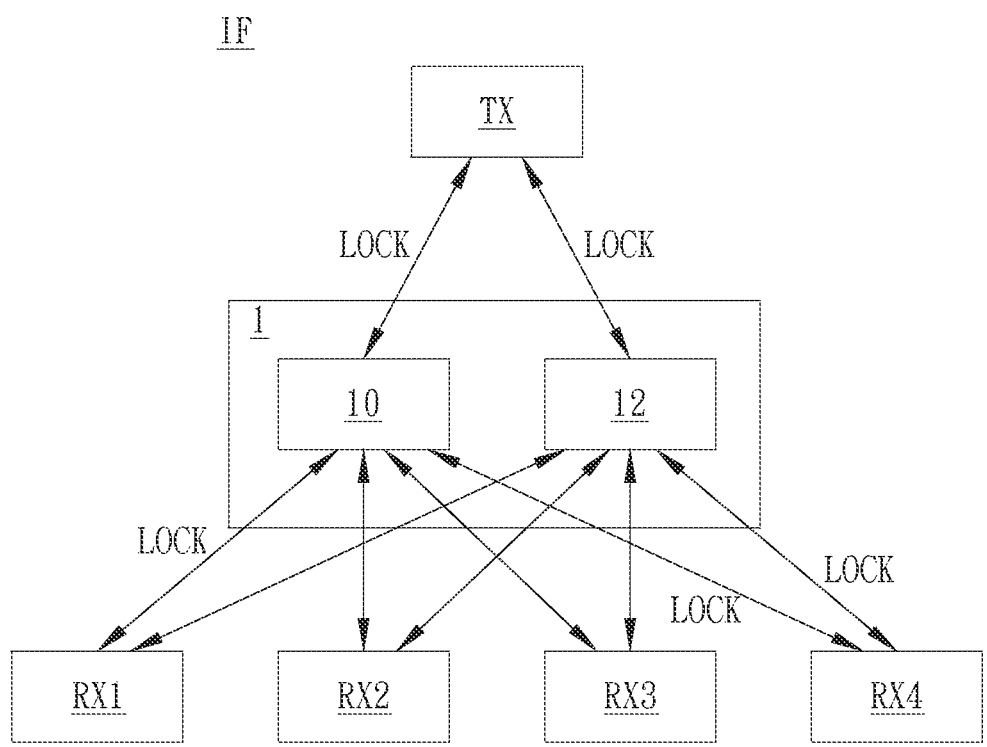
FIG. 4 illustrates a functional block diagram of the bi-directional full-duplex lock system.

As shown in FIG. 4, the bi-directional full-duplex lock system 1 includes a detection module 10 and a control module 12. Wherein, the control module 12 is coupled to the detection module 10; the detection module 10 is coupled to the transmitter TX and the receivers RX1~RX4 respectively; the control module 12 is coupled to the transmitter TX and the receivers RX1~RX4 respectively.

In this embodiment, the detection module 10 detects a transmitter link state of the transmitter TX and receiver link states of the receivers RX1~RX4 respectively. The control module 12 is coupled to the detection module 10. The control module 12 controls the transmitter TX to transmit a lock signal LOCK to at least one of the receivers RX1~RX4; the control module 12 also controls the at least one of the receivers RX1~RX4 to transmit the lock signal LOCK to the transmitter TX; the control module 12 also controls a receiver (e.g., RX1) of the receivers RX1~RX4 to transmit the lock signal LOCK to another receiver (e.g., RX4).

It should be noticed that the lock signal LOCK outputted by the transmitter TX relates to the transmitter link state of the transmitter TX and the lock signal LOCK outputted by the receivers RX1~RX4 relates to the receiver link states of the receivers RX1~RX4.

In detail, when the transmitter link state of the transmitter TX is active and in the lock state, the control module 12 will control the lock signal LOCK outputted by the transmitter TX have a first phase (high-level); when the transmitter link state of the transmitter TX is invalid and in the unlock state, the control module 12 will control the lock signal LOCK outputted by the transmitter TX have a second phase (low-level) opposite to the first phase.

Similarly, when the receiver link states of the receivers RX1~RX4 are active and in the lock state, the control module 12 will control the lock signal LOCK outputted by the receivers RX1~RX4 have a first phase (high-level); when the receiver link states of the receivers RX1~RX4 is invalid and in the unlock state, the control module 12 will control the lock signal LOCK outputted by the receivers RX1~RX4 have a second phase (low-level) opposite to the first phase.

Therefore, as shown in FIG. 3, when the transmitter TX transmits the lock signal LOCK having the first phase (high-level) to the receivers RX1~RX4, if the transmitter TX is changed from the lock state to the unlock state, a phase of the lock signal LOCK transmitted from the transmitter TX to the receivers RX1~RX4 will be reversed from the first phase (high-level) to the second phase (low-level) opposite to the first phase during a specific period of time, so that the receivers RX1~RX4 can detect whether the frequency of the receivers RX1~RX4 is correct.

Compared to the prior arts, the bi-directional full-duplex lock system and the bi-directional full-duplex lock system operating method of the invention are applied in a data transmission interface of a LCD apparatus and they can effectively improve the lock signal communication mechanism used in the current high-speed transmission interface of the LCD apparatus. Therefore, the link states among source driver ICs can be effectively confirmed, so that when a link of one of the source driver ICs is invalid, the normal source driver ICs will not blind display.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

The invention claimed is:

1. A bi-directional full-duplex lock system, applied in a data transmission interface, the data transmission interface comprising at least one transmitter and at least one receiver, the bi-directional full-duplex lock system comprising:
a detection module, the detection module detecting a transmitter link state of the at least one transmitter and a receiver link state of the at least one receiver respectively; and
a control module, coupled to the detection module, the control module controlling the at least one transmitter to transmit a lock signal to the at least one receiver, controlling the at least one receiver to transmit the lock signal to the at least one transmitter, and controlling a receiver of the at least one receiver to transmit the lock signal to another receiver of the at least one receiver;
wherein the lock signal relates to the transmitter link state and the receiver link state; when the at least one transmitter transmits the lock signal to the at least one receiver, a phase of the lock signal is reversed during a specific period of time for the at least one receiver to detect whether a frequency of the at least one receiver is correct;
wherein the at least one transmitter and the at least one receiver are originally in a unlock state, when the at least one transmitter starts to transmit a data to the at least one receiver, the control module changes the at least one transmitter from the unlock state to a lock state and start a training of the at least one receiver;
wherein after the training of the at least one receiver is done, the control module changes the at least one receiver from the unlock state to the 3 lock state, so the at least one transmitter and the at least one receiver are both in the lock state, and the lock signal of the at least one transmitter and the at least one receiver have a first phase at this time.

2. The bi-directional full-duplex lock system of claim 1, wherein when the specific period of time is started, the control module changes the at least one transmitter to the unlock state, the lock signal transmitted by the at least one transmitter to the at least one receiver has a second phase opposite to the first phase, so the at least one receiver can detect whether the frequency of the at least one receiver is correct.

3. The bi-directional full-duplex lock system of claim 2, wherein when the at least one receiver detects that the frequency of the at least one receiver is correct, the control module changes the at least one transmitter to the lock state; when the at least one receiver detects that the frequency of the at least one receiver is not correct, the control module changes the at least one receiver to the unlock state.

4. A method of operating a bi-directional full-duplex lock system, the bi-directional full-duplex lock system being applied in a data transmission interface, the data transmission interface comprising at least one transmitter and at least one receiver, the method comprising steps of:
(a) controlling the at least one transmitter and the at least one receiver originally in a unlock state;

(b) when the at least one transmitter starts to transmit a data to the at least one receiver, changing the at least one transmitter from the unlock state to a lock state and starting a training of the at least one receiver;

(c) finishing the training of the at least one receiver and changing the at least one receiver from the unlock state to the lock state;

(d) changing the at least one transmitter to the unlock state and the at least one receiver detecting whether a frequency of the at least one receiver is correct; and (e) selectively changing the at least one transmitter to the lock state or changing the at least one receiver to the unlock state according to a detecting result of the step (d).

5. The method of claim 4, wherein the step (c) comprises steps of:
   (c1) determining whether a receiver link state of the at least one receiver is invalid; and
   (c2) if a determining result of the step (c1) is yes, changing the at least one receiver to the unlock state.

6. The method of claim 4, wherein the step (c) comprises steps of:
   (c1') determining whether the at least one receiver receives wrong data; and
   (c2') if a determining result of the step (c1') is yes, changing the at least one receiver to the unlock state.

7. The method of claim 4, wherein the at least one transmitter transmits a lock signal to the at least one receiver, in the step (c) and the step (d), the at least one transmitter is changed from the lock sate to the unlock state, so the lock signal is reversed during a specific period of time, and the at least one receiver can detect whether a frequency of the at least one receiver is correct.

8. The method of claim 4, wherein the step (e) comprises steps of:
   (e1) if a determining result of the step (d) is yes, changing the at least one transmitter to the lock state; and
   (e2) if a determining result of the step (d) is no, changing the at least one receiver to the unlock state.

* * * * *